FIG.4
FIG.5
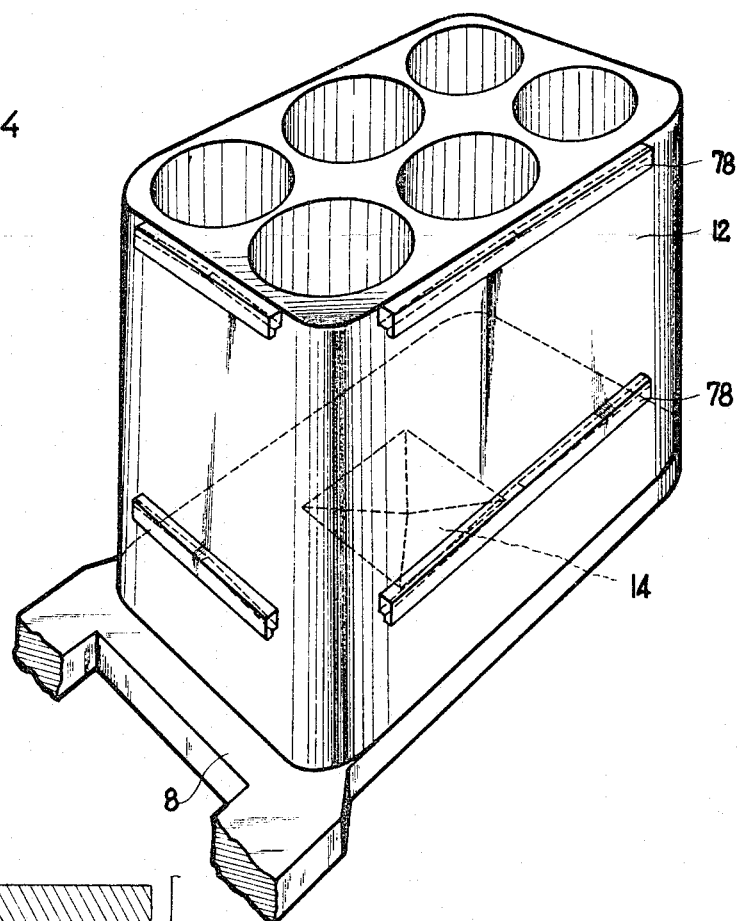
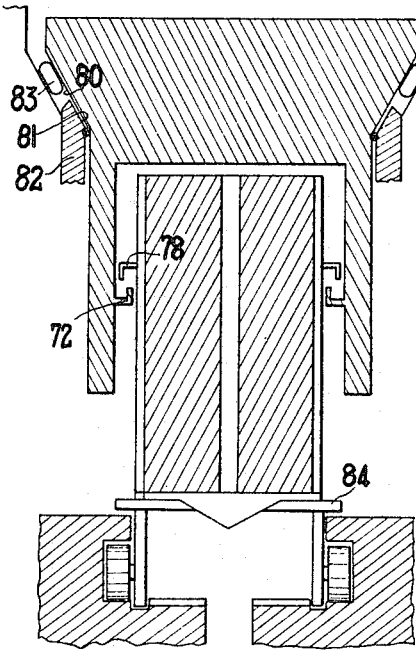

United States Patent Office 3,291,326
Patented Dec. 13, 1966

3,291,326
CHARGING DEVICE FOR A NUCLEAR REACTOR REFUELLING FACILITY
Bernard Leclere, Massy, Georges Lemesle, Paris, and Jean Vivien, Versailles, France, assignors to Commissariat a l'Energie Atomique, Paris, France
Filed Feb. 3, 1964, Ser. No. 341,870
Claims priority, application France, Feb. 28, 1963, 926,413
8 Claims. (Cl. 214—18)

The present invention relates to a device for the introduction of objects in a leak-tight vessel and for the withdrawal of objects from said vessel, said device being especially intended to be incorporated in the refueling facility of a gas-cooled reactor of the type comprising a servicing chamber and being accordingly designed for the purpose of introducing fuel element magazines within said servicing chamber and withdrawing them therefrom.

The term "servicing chamber" is understood to refer to the enclosed space which is formed within the pressure-resistant and biological-shield casing of the reactor either above or below the chamber which contains the reactor core, and which is separated from the core chamber by a biological shield for attenuating the radiation emitted by the core. There can be disposed within the servicing chamber a number of different equipment units and in particular a fuel element handling unit which serves to re-charge the channels in which the fuel elements are disposed.

The presence of a servicing chamber endows nuclear reactors with a number of advantages; among these can be mentioned in particular the greater ease with which fuel elements can consequently be transferred between the fuel channels and the handling unit (a passageway can be provided for this purpose within the biological shield in alignment with each fuel channel), the possibility of storage of irradiated fuel elements within the reactor vessel for a length of time such that the residual activity of said fuel elements is sufficiently low to dispense with any need for cooling of these latter while they are being discharged to the storage pond; and the further possibility of employing conventional mechanisms within the servicing chamber, provided that the temperature of said chamber is maintained at a sufficiently low value.

It is already known to make use of refuelling machines within the pressure vessel of a nuclear reactor. However, the operations involving the introduction and withdrawal of fuel element containers or magazines are carried out by means of a conventional lock chamber system.

The present invention is concerned with a device for introduction and withdrawal which is of simple design and which can be employed for the purpose of transferring fuel element magazines between the servicing chamber and the exterior of the reactor.

With this object in view, the device in accordance with the invention consists of first means which are movable within a first tunnel so as to effect the transfer of objects between a station which is in communication with the reactor vessel and a transit compartment, second means which are movable within a second tunnel and which effect the transfer of objects between the transit compartment and another station which is in communication with the exterior of the reactor vessel, first sealing members disposed between the first means and the first tunnel so as to separate the transit compartment from the reactor vessel when the first means are in a position in which the objects are located within said compartment and second sealing members disposed between the second means and the second tunnel so as to separate the transit compartment from the exterior when the second means are in a position in which the objects occupy the other station.

The invention will be more clearly understood by perusal of the following description of one form of embodiment which is given solely by way of non-limitative example, reference being made to the accompanying drawings, wherein:

FIG. 4 is a view in perspective of a magazine;

FIG. 5 is a diagrammatic detail view on a large scale of the cage of the second elevator as represented in the bottom position and occupied by a magazine.

Figure 1:
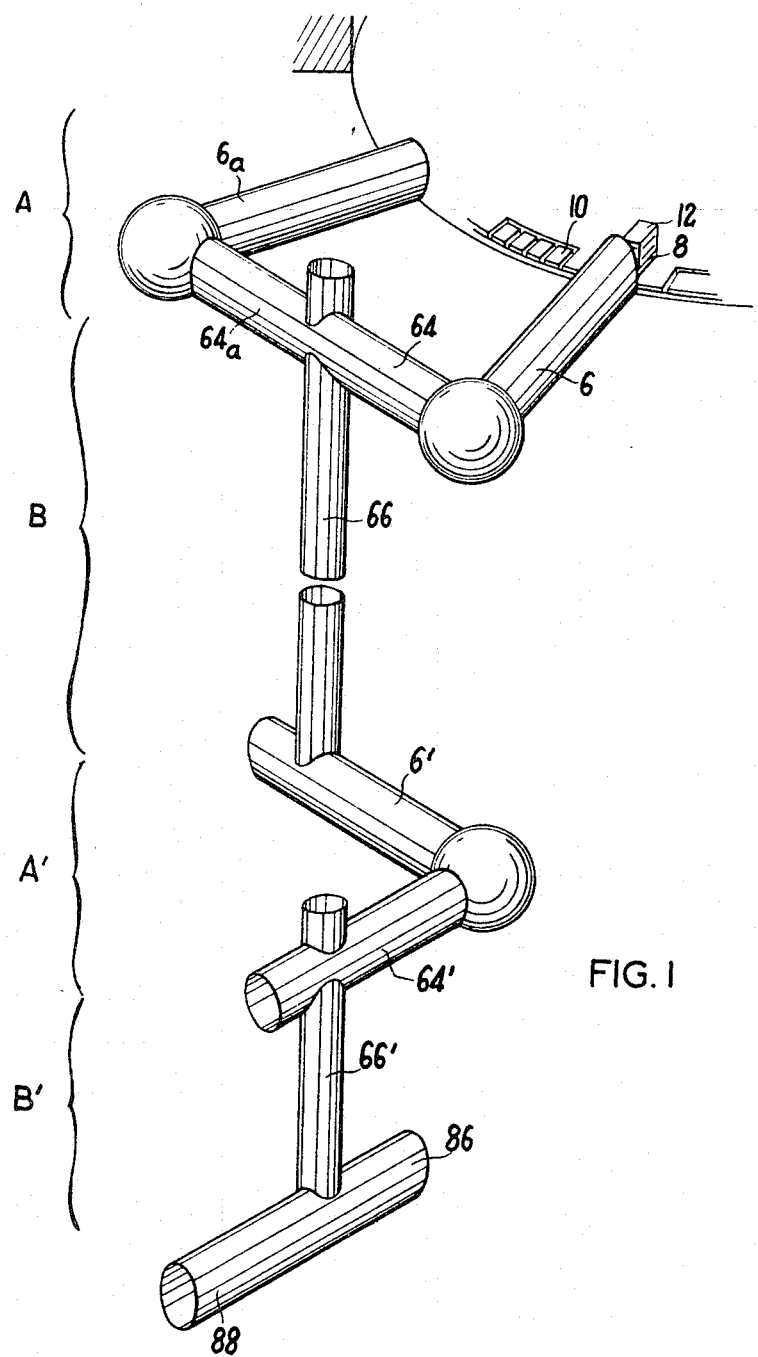
FIG. 1 is a general diagram showing the location of the device with respect to the reactor.

The device for introduction and withdrawal which is illustrated in the drawings is intended for a nuclear reactor of the gas-cooled, solid moderator type which is equipped with a handling unit of the type described in the copending French patent application No. 911,501. However, the device in accordance with the invention can equally well be employed, at the price of detail modifications, in any refuelling facility which comprises a handling system of the type described in French Patent No. 1,326,401 and, in a more general manner, in any handling system comprising a servicing chamber.

The handling device which is described in the copending French patent application No. 911,501 consists of a horizontal beam which can be oriented about the vertical axis of the reactor so as to be brought either in oppositely facing relation to any one of a series of magazine storage stations arranged at the periphery of the servicing chamber or in oppositely facing relations to one of the stations to which or from which said magazines are either brought or removed by the introduction and withdrawal device. Reference can also usefully be made to the copending patent application earlier identified for a more comprehensive description of the handling unit.

The system in accordance with the invention consists of one or a number of independent assemblies, one of which will now be described below. Each assembly such as that which has been shown diagrammatically in FIG. 1 can be split up at will into a system A for the transfer of fuel element magazines between a station for introduction in and withdrawal from the servicing chamber and a first transit station, an elevator B for transporting magazines between the transit station and a second transit station, a second transfer system A' (which is similar to the system A) and finally a second elevator B' (which is similar to the elevator B).

The transfer system A is duplicated so as to ensure safety of operation of the system as a whole, of which said transfer system A constitutes a non-accessible portion outside the periods of depressurization of the reactor since it is in permanent communication with the servicing chamber.

Figure 2:
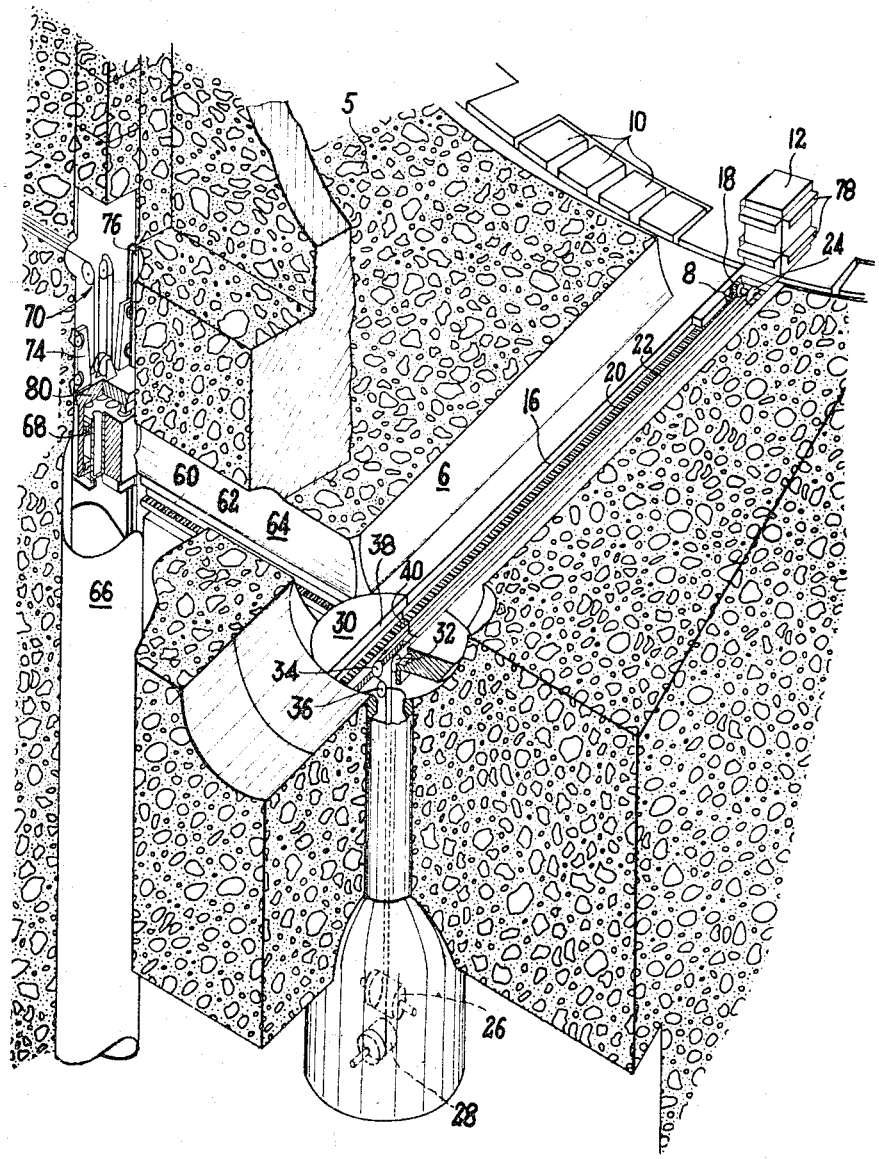
FIG. 2 is a view in perspective of the top portion of the device.
Figure 3:
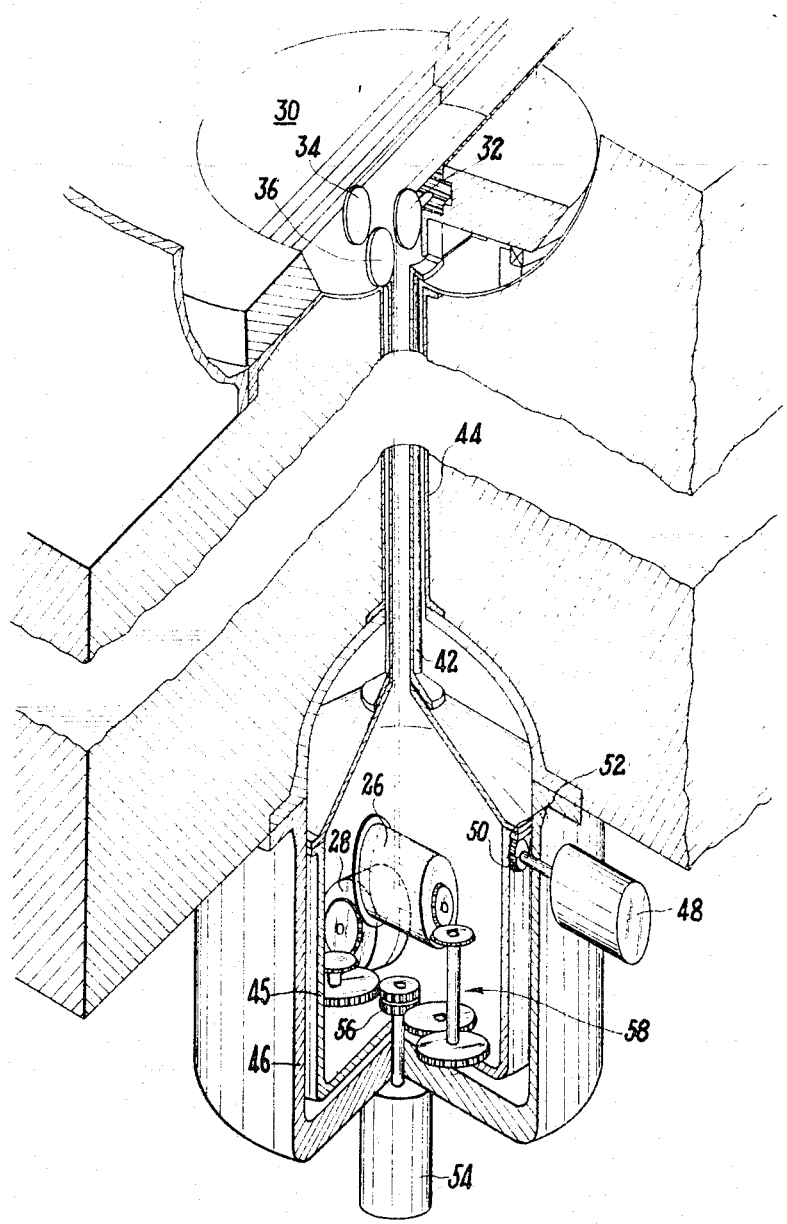
FIG. 3 is a detail view on a large scale showing the operating mechanism of the system for transferring magazines between the reactor vessel and the first elevator.

Each of the two symmetrical portions of the system A (as shown in FIGS. 1, 2, and 3) opens into the servicing chamber through the biological shield structure 5 of the reactor opposite an introduction and withdrawal station 8 via a tunnel 6 or 6a (as shown in FIG. 1). The said station 5 is occupied by a magazine transporter trolley, the driving mechanism of which will be described hereinafter.

The handling device which is arranged within the servicing chamber and which has not been shown in the drawings serves to take a fuel element magazine from any one of the storage stations such as station 10 which are spaced apart at the periphery of the servicing chamber and to bring said magazine onto the introduction and withdrawal station 8 or conversely.

In order to impart a suitable angular orientation to the fuel element magazines, provision is made on said magazines 12 (as shown in FIG. 4) for a pyramidal projection 14 which is adapted to fit inside a recess of corresponding shape formed in the trolley 8 which constitutes an introduction and withdrawal station; a portion of said trolley is shown in FIG. 4.

When once it has been released from the handling system, the magazine 12 rests only on the trolley 8, said trolley being designed to run on two rails 16 having a U-shaped cross-section which are laid at the bottom of the tunnel 6 (as shown in FIG. 2). The displacements of the trolley are effected by means of a pinion 18 which meshes with a rack 20, the said rack being also laid at the bottom of the tunnel between the two rails 16. The pinion is driven by a stud chain cable 22 which drives in rotation a pulley 24 which is integral with the shaft of the pinion 18.

The two cable-ends are moved respectively by two winches 26 and 28 which have different winding speeds so as to take into account variations in length of cable during the displacements of the trolley 8. A standby cable is also provided in the event of breakdown for the purpose of bringing back the trolley 8 onto a switching turntable 20. The cable extends from the winch 26 to the winch 28 in a direction parallel to the axis of rotation of the turntable, passes over a guide pulley at an angle of 90°, then over the pulley 24 and over two guide pulleys 34 and 36 and returns to the winch 28 parallel to the axis of the turntable.

The rails 16 and the rack 20 are extended by track segments 38 and 40 which are laid on the switching turntable 30.

The switching turntable 30 is integral with a bushing 42 which is adapted to rotate within a conduit 44 formed through the concrete biological shield structure 5. There is fixed at the lower extremity of said bushing a pot 45 which contains the trolley drive mechanism, in particular the winches 26 and 28 (as shown in FIG. 3). The pot 45 is enclosed within a bell-housing 46 which is coupled in leak-tight manner to the reactor casing 5. The enclosure which is formed by the bell-housing 46, the conduit 44 and the wall of tunnel 6 thus remains isolated both from the atmosphere and from the pressure of the reactor.

The turntable 30 is driven in rotation by a motor 48 which is located outside the bell-housing. The drive shaft of the motor 48 traverses the wall through a leak-tight gland and terminates in a pinion 50 which meshes with a toothed ring 52 carried by the pot. The winches 26 and 28 are driven by a single motor 54 which is also placed outside the bell-housing 46 and the drive shaft of which traverses said bell-housing along the axis of rotation of the pot and terminates in a pinion 56 which drives a gear-train 58, said gear-train being in turn coupled to the winches.

The turntable 30 can be brought into an orientation such that the track segment 38 and rack-segment 40 which are laid thereon are respectively opposite two rails 60 and a rack 62 which are laid within a second tunnel 64 which is preferably not in alignment with the first.

Said second tunnel 64 opens into a vertical elevator shaft 66. The elevator which is shown in FIGS. 2 and 5 is composed of one elevator cage 68, of a driving mechanism 70 of conventional type and the guide bushing or shaft tube 66, the lower extremity of which opens itno the tunnel 6' of the system A' which is similar to the tunnel 6 of the system A.

The trolley is provided relatively to the portion which receives the magazine with a cantilevered extension which permits the guide rails 60 and the rack 62 to stop short of the elevator shaft 66 so as to leave this latter free.

The elevator cage (as shown in FIGS. 2 and 5) is fitted with internal guides 72 and guiding arms 74 fitted with rollers which are adapted to run in stationarily fixed rails such as the rail 76. The distance between the guides 72 corresponds to the distance between the coupling flanges 78 which are provided on the magazine (as shown in FIG. 4). The top portion of the elevator cage 68 is applied in the bottom position thereof against a bearing surface 81 of corresponding shape which is formed on a demountable component located at the bottom of the elevator shaft and fitted with sealing gaskets 82. Provision is made within the elevator shaft and above said demountable component for an inflatable seal 83. The said seal is inflated so as to provide temporary leak-tightness when the seal-holder component is removed in the event of replacement of the seal.

The systems A' and B' are similar to the system A and B. The transfer system A' which differs from the system A in that it is not duplicated, occupies two tunnels located at right angles in the form of embodiment which has been illustrated. The trolley of system A' transfers the magazines between two transit stations which are respectively located at the bottom of the elevator shaft 66 and at the top of the elevator shaft 66' (as shown in FIG. 1). The elevator B' either takes magazines from or deposits magazines on a trolley 84 which is movable within a conduit 86 for the supply of magazines which are filled with new fuel elements and within a conduit 88 for discharge of spent fuel elements to the deactivation pond (FIG. 1).

The cage of the elevator B' cooperates with its shaft 66' in the same manner as the elevator cage 68 cooperates with the elevator shaft 66 so as to provide a leak-tight coupling when the elevator cage is in the bottom position thereof; accordingly, the sections A' and B' (tunnels 6' and 64', elevator shaft 66') constitute a transit compartment which can be connected either to the reactor pressure or to atmospheric pressure.

*Operation*

The operation of the system in the course of a discharge sequence will now be described in reference to all the figures of the accompanying drawings. At the moment of commencement of this sequence, a magazine 12 filled with irradiated fuel elements has been brought by the handling unit onto the introduction and withdrawal station which is occupied by the trolley 8 (shown in FIGS. 1 and 2); the cage of the elevator B' is in the bottom position and separates the elevator shaft 66' from the conduits 86 and 88 which are maintained at atmospheric pressure; the elevator cage 68 is empty and occupies the position in which it is shown in FIG. 2, thus putting the tunnels 6 and 64 into communication with the elevator shaft 66, and the tunnels 6' and 64' with the elevator shaft 66'. In this manner, the pressure of the reactor prevails throughout the systems A, B, A' and B'.

The motor 54 is started up and drives the winches 26 and 28 which bring the trolley 8 onto the turntable 30. The motor 48 is started up in its turn and orients the turntable so that the track segment 38 is brought into alignment with the track 60 of the tunnel 64. The winches are once again actuated in the reverse direction to the previous movement and bring the trolley into the shaft 66 of the elevator B. During the final phase of this movement, the coupling flanges 78 of the magazine 12 engage inside the guides 72 which are provided for this purpose on the elevator cage 68. The elevator is lifted to a slight extent so as to detach the magazine 12 from its transporter trolley and so as to permit the possibility of returning this latter to the introduction and withdrawal station, or at least of withdrawing said trolley away from the elevator shaft while the discharging operations are in progress.

The drive mechanism 70 of the elevator B is actuated so as to bring the elevator cage 68 into the bottom position in which it is shown in FIG. 5. The trolley of the transfer system A' has previously been brought into the position in which it engages inside the elevator shaft 66 and can accordingly receive the magazine 12.

At the end of travel of the elevator cage, the magazine 12 comes to rest on the trolley of system A' whilst the elevator cage moves downwards slightly so as to detach the guides 72 from the coupling flanges 78 and so as to bear on the portion 81. The seals 82 then ensure the leak-tight separation of the elevator shaft 66 from the tunnel 6'.

The transit compartment is then connected to atmospheric pressure by means of conduits which have not been shown in the drawings, whereupon the cage of the elevator B' is brought to the top position, the systems A' and B' thus being at atmospheric pressure.

The transfer system A' is then actuated and accordingly caused to carry out a series of operations which are similar to those which have been described above in reference to the system A and to bring the magazine into engagement with the cage of the elevator B'.

The aforesaid cage of the elevator B' finally deposits the magazine onto the trolley 84 for removal to the storage pond.

The same trolley 84 or a similar trolley brings back another magazine filled with new fuel elements, said magazine being taken over by a process which is performed in the reverse sequence to the preceding so as to be brought to the introduction and withdrawal station 8.

Finally, it will be readily apparent that the invention is not limited to the form of embodiment which is given by way of example and it will be understood that the invention includes within its scope all those alternative forms of the system and of the constituent elements of said system which remain within the scope of equivalent mechanical means.

What we claim is:

1. A device for the introduction of fuel element magazines in a servicing chamber in the pressure vessel of a gas-cooled nuclear reactor and for the withdrawal of the magazines from the chamber comprising a station in the chamber, a transfer compartment, a first shaft between said transfer compartment and said station, first means rectilinearly movable within said first shaft to transfer the magazines between said station and said transfer compartment, a second shaft, a second station in communication with the exterior of the vessel, second means rectilinearly movable within said second shaft to transfer the magazines between said transfer compartment and said second station, first sealing members disposed between said first means and said first shaft separating said transit compartment from the vessel when said first means are in a position in which the magazines are located within said transit compartment and second sealing members disposed between said second means and said second shaft separating said transit compartment from the exterior of the vessel when said second means are in a position in which the magazines occupy said second station.

2. A device for the introduction of objects in a leak-tight vessel and for withdrawal of the objects from the vessel, a transit compartment, a station in communication with the exterior of the vessel, a first tunnel between said transit compartment and said station, first means movable within said first tunnel to transfer objects between said transit compartment and said station, first sealing members disposed between said first means and said first tunnel to separate said transit compartment from the vessel when said first means are in a position in which the objects are located within said transit compartment, a second station, a second tunnel in communication with said station and with said second station, second transfer means in said second tunnel, second sealing members disposed between said second means and said second tunnel to separate said transit compartment from the exterior when said second means are in a position in which the objects occupy said second station, said first and second transfer means each including an elevator cage movable within a vertical elevator shaft, sealing means at the bottom of each of said elevator shafts cooperating with the corresponding one of said cages and providing a leak-tight separation between said cage and said sealing means when in contact.

3. Device as described in claim 2, said first and second transfer means each including a support trolley, a turntable, means for displacing the trolley within the appropriate one of said tunnels between said elevator shaft and said turntable within said tunnel and a system for rotating each of said turntables between two positions in which said turntable is respectively in alignment with each of said tunnels.

4. Device as described in claim 3 including assemblies integral with said turntables supporting said means for displacing said trolleys.

5. Device as described in claim 3, each of said elevators and the appropriate one of said trolleys being disposed in series.

6. Device as described in claim 5 including a nuclear reactor servicing chamber, two substantially identical assemblies in series, each comprising two of said tunnels disposed horizontally and at right angles to each other within the biological shield structure of the reactor, said tunnels being coupled by one of said turntables and the respective one of said trolleys being adapted to travel through said turntable.

7. Device as described in claim 6 including a pot for each of said transfer means for driving said trolley, said pot being integral with the corresponding one of said turntables, a bushing connecting said pot to the respective one of said turntables, said bushing being coaxially with the axis of rotation of the adjacent one of said turntables and projecting from the exterior of the biological shield structure of the reactor.

8. Device as described in claim 7, said pot being contained within a housing secured to the shield structure of the reactor and joined to the corresponding one of said tunnels, a motor driving said pot and the corresponding one of said turntables in rotation and located outside the reactor shield structure and driving said turntable through a leak-type coupling and a motor for driving said trolley located outside said pot in the axis of rotation of said pot and driving through a leak-type coupling.

References Cited by the Examiner
UNITED STATES PATENTS 3,196,082   7/1965   Lemesle et al. _____ 214—18 X GERALD M. FORLENZA, *Primary Examiner.*

ROBERT G. SHERIDAN, *Examiner.*